United States Patent Office 3,525,724
Patented Aug. 25, 1970

3,525,724
FLUOROCARBON POLYMERS COMPRISING CARBONYL GROUPS
Edward Noonan Squire, Glen Mills, Pa., and William Franklin Gresham, Wilmington, Del., assignors to E. I. du Pont de Nemours and Company, Wilmington, Del., a corporation of Delaware
No Drawing. Filed Jan. 13, 1967, Ser. No. 608,974
Int. Cl. C08f 27/22, 15/02
U.S. Cl. 260—87.5
13 Claims

ABSTRACT OF THE DISCLOSURE

Fluorocarbon polymers comprising at least 0.1 mole percent difluoroketene units, —$CF_2$—C(O)—, which are useful as molding resins. A process for preparing said polymers by reacting fluorocarbon homo- or copolymers comprising alkyl trifluorovinyl ether units, —$CF_2$—CF(OR)—, with a Lewis acid selected from the class consisting of sulfur trioxide, aluminum trichloride, and titanium tetrachloride, whereby at least part of the ether units are converted to the ketene units. The reaction can be conducted in the presence of a liquid medium, such as a fluorocarbon, in an inert atmosphere at a temperature in the range of about 20–200° C. for about 1–75 hours.

This invention relates to fluorocarbon polymers, and more particularly, to fluorocarbon polymers containing difluoroketene groups, and the preparation thereof.

Tetrafluoroethylene is referred to herein as TFE; methyl trifluorovinyl ether, as MTVE; perfluoro-2-methylene-4-methyl-1,3-dioxolane, as PMD; and difluoroketene units, —$CF_2$C(O)—, as DFK.

This invention provides fluorocarbon polymers which have carbonyl groups in the backbone thereof, as well as a process for the synthesis of such polymers.

The present invention comprises a process for preparing fluorocarbon polymers comprising at least 0.1 mole percent DFK units, said process comprising reacting fluorocarbon polymers which comprise alkyl trifluorovinyl ether units, —$CF_2$—CF(OR)—, with a Lewis acid selected from the class consisting of sulfur trioxide, aluminum trichloride and titanium tetrachloride, whereby at least part of the ether monomer units are converted to DFK units. The R group in the alkyl trifluorovinyl ether monomer is a monofunctional alkyl group, preferably the methyl group. The reaction can be conducted in the presence of a liquid fluorocarbon medium. The reaction temperature can be in the range 20–200° C. and the reaction time in the range 1–75 hours.

The starting polymer in the process of the present invention, i.e., a fluorocarbon polymer or copolymer comprising alkyl trifluorovinyl ether units, can be synthesized as follows. First the alkyl trifluorovinyl ether monomer, CF=CF(OR), can be prepared according to U.S. Pat. 2,917,548, issued to S. Dixon on Dec. 15, 1959. Then that ether monomer can be allowed to polymerize with itself, or can be copolymerized with TFE according to U.S. Pat. 3,159,609, issued to J. F. Harris, Jr. and D. I. McCane on Dec. 1, 1964. Moreover, comonomers other than TFE and an alkyl trifluorovinyl ether can additionally be employed in the synthesis of the starting polymers. PMD and hexafluoropropylene, $CF_2$=CF—$CF_3$ are useful termonomers.

The nature of the alkyl group in the alkyl trifluorovinyl ether monomer unit can be varied widely in the process of this invention. Thus, the alkyl group can, for example, contain up to 5 or 6 carbon atoms. Since the alkyl group is removed in the process of the present invention, economics dictate that smaller alkyl groups are preferred in the practice of this invention. Thus, the optimum alkyl trifluorovinyl ether monomer is MTVE.

The alkyl trifluorovinyl ether starting polymer in this invention should be supplied to the reaction system in a state of subdivision which will allow an appreciable rate of conversion. Hence, suspensions of the starting polymer as prepared may be employed, and are preferred in this process. Should the starting polymer have been recovered and dried prior to reaction according to this invention, it is preferred that its state of subdivision be reduced, for example in a blender or in a reaction flask equipped with a chopper blade stirrer.

The Lewis acid employed herein is a strong acid. Illustrative of useful Lewis acids are aluminum trichloride, sulfur trioxide, and titanium tetrachloride. Sulfur trioxide is the preferred Lewis acid herein.

The reaction conditions employed in the process of this invention can be varied, but are selected interdependently. Factors influencing such selection are the molecular weight and state of physical subdivision of the starting polymer, the percentage of ether units in that polymer, the wettability of that polymer by the liquid medium (if any), the strength and relative concentration of the Lewis acid, etc. It is preferred that the reaction be conducted in an inert atmosphere, i.e., under dry nitrogen or in vacuum.

The reaction time and temperature should be selected so as to give a reasonable rate of conversion. Typical conditions comprise a reaction time of about 1–75 hours and a temperature in the range of about 20–200° C. To attain a good conversion rate, a temperature in the range 80–180° C. will often suffice, as will a reaction time of about 1–16 hours.

When titanium tetrachloride or sulfur trioxide is employed as the Lewis acid herein, the reaction can be conducted in the absence of any solvent in the temperature range where these Lewis acids are in the liquid state. Aluminum chloride, since it has such a high melting point, requires the presence of a solvent therefor. Although the reaction with sulfur trioxide and titanium tetrachloride can be conducted in the absence of a solvent, a solvent is preferred. The solvent selected should be inert to the reactants and is conveniently selected from among the liquid fluorocarbons boiling below 160° C. Illustrative of such solvents are $CCl_2FCClF_2$, $CClF_2CClFCCl_2F$, $CCl_2FCF_2CCl_2F$, $CF_3CCl_2CClF_2$, and $CF_3CClFCCl_2F$. $CCl_2FCClF_2$ is preferably employed due to its availability in a relatively dry form.

The amount of Lewis acid employed can, of course, be varied. To attain a good rate of conversion from ether to DFK units, it is preferred that the quantity of Lewis acid, on a molar basis, equal or exceed the amount of ether monomer units in the polymer.

The reaction can be conducted in various types of equipment. A stainless-steel pressure tube is useful when sulfur trioxide is employed as the Lewis acid and a high reaction pressure is desired. For lower reaction pressures, a glass vessel equipped with a reflux condenser may be employed. The reaction may be conducted at room temperature and atmospheric pressure in a Waring Blendor.

After conversion of at least part of the alkyl trifluorovinyl ether units to DFK units according to this invention, the polymer can be recovered and cleaned by washing with nitric acid and then with water.

EXAMPLES

The following examples are presented to illustrate, but not to restrict the present invention. Quantities of monomer units in the polymers are expressed in terms of mole percent unless otherwise noted.

The monomer content of the ether polymers before reaction with a Lewis acid according to the present invention and of the ketene polymers of this invention was usually determined by infrared analysis. The results reported in the table were obtained by the following method, unless otherwise indicated herein. Films of the polymer about 1-mil thick (about 1-4 mils thick for polymers comprising PMD monomer) were pressed as described in each example and infrared spectra were obtained on either a Perkin-Elmer "Infracord" Spectrometer or a Perkin-Elmer "Model 21" Infrared Spectrometer.

The mole percentage of MTVE in these polymers is proportional to the infrared absorbance at about 10.4 microns, that of TFE at about 4.25 microns, that of DFK at about 5.6 microns, and that of PMD at about 9.95 microns.

For TFE/MTVE copolymers comprising up to 27.7 mole percent MTVE, the amount of MTVE was calculated from the spectra data as follows:

$$\text{Mole Percent MTVE} = \frac{\text{absorbance at } 10.4\mu}{(\text{absorbance at } 4.25\mu)(0.108)}$$

Then mole percent TFE was calculated by subtracting mole percent MTVE from 100. In TFE/MTVE copolymers comprising more than 27.7 mole percent MTVE, MTVE was determined as follows:

$$\text{Mole Percent MTVE} = \frac{\frac{\text{absorbance at } 10.4\mu}{\text{absorbance at } 4.25\mu} - 3}{0.263}$$

The error in the mole percent MTVE by this method was ±7% relative (as distinguished from absolute percentage). Mole percent TFE was then found by subtracting mole percent MTVE from 100.

The mole percent DFK in TFE/MTVE/DFK polymers was calculated by first determining the mole ratio ($R_1$) of MTVE to TFE in the TFE/MTVE/DFK by the methods above. The mole percent MTVE and DFK in the polymer was determined as follows:

Mole percent MTVE in TFE/MTVE/DFK polymer
= ($R_1$)(mole percent TFE in TFE/MTVE polymer)

Then,

Mole percent DFK in TFE/MTVE/DFK polymer
= Mole percent MTVE in TFE/MTVE polymer
− Mole percent MTVE in TFE/MTVE/DFK polymer The mole percent of PMD in TFE/MTVE/PMD terpolymers was calculated as follows. First, the mole ratio ($R_1$) of MTVE to TFE was determined as above. The mole ratio of PMD to TFE ($R_2$) was calculated by first determining the hypothetical mole percent PMD (H-PMD) as follows:

$$(\text{H-PMD}) = \frac{(\text{absorbance at } 9.95\mu)(0.73)}{(\text{absorbance at } 4.25\mu)}$$

Then the hypothetical mole percent TFE (H-TFE) is found by subtracting (H-PMD) from 100. Then, $$R_2 = \frac{\text{moles PMD}}{\text{moles TFE}} = \frac{\text{H-PMD}}{\text{H-TFE}}$$

The actual mole percent TFE was calculated as follows:
mole percent TFE + ($R_1$)(mole percent TFE) + ($R_2$)(mole percent TFE) = 100 and then $$\text{Mole Percent TFE} = \frac{100}{1 + (R_1) + (R_2)}$$

The mole percent PMD and mole percent MTVE were then calculated as follows:

mole percent PMD = ($R_2$)(mole percent TFE)
mole percent MTVE = ($R_1$)(mole percent TFE)

The amounts of the monomer units in TFE/DFK/ n—$C_4H_9OCF=CF_2$ were calculated from elemental analysis data. The n=$C_4H_9OCF=CF_2$ content in the parent copolymer, TFE/n=$C_4H_9OCF=CF_2$, was then the sum of DFK and ether mole percentages in the terpolymer derived therefrom.

The sulfur trioxide employed herein was freshly distilled prior to each synthesis. The liquid fluorocarbon employed in all but one example was $CCl_2FCClF_2$, which was dried over sodium sulfate to less than 10–20 p.p.m. of water. When reactions herein were conducted in shaker tubes, stainless-steel shaker tubes were employed and were shaken at eighty-four 12-inch strokes per minute.

EXAMPLE I

There is described herein the synthesis of a DFK polymer from MTVE homopolymer in the presence of sulfur trioxide. The DFK polymer was isolated in the form of a hydrate thereof.

(A)

MTVE homopolymer was prepared by allowing 35 grams of the monomer to stand in a 150 ml. stainless-steel cylinder under autogenous pressure at room temperature for several months, after which unpolymerized monomer was removed and the solid homopolymer recovered as a finely divided fluffy powder.

(B)

The MTVE homopolymer prepared in A (4.5 grams) was then suspended in 20 ml. of $CCl_2FCClF_2$ in a 100 ml. flask equipped with a stirrer, reflux condenser, and a drying tube containing sodium sulfate. Then 5 ml. of sulfur trioxide was added to the flask and the mixture stirred for 16 hours at 26° C. The volatile materials were removed in vacuum, leaving the solid polymer in the flask.

To the flask there was added 100 ml. of concentrated nitric acid, and the mixture was stirred for 15 minutes at 40–80° C., to remove the small amount of colored material present. The mixture was filtered, and the solid washed with three 50–100 ml. portions of ice water. The resultant white polymeric material was dried in vacuum at 110° C. for 16 hours, then a portion thereof was pressed at 170° C. and about 300 p.s.i. into a transparent film. The infrared spectrum of the film showed the absence of MTVE units, as confirmed by the elemental analysis data. The polymer formed is a homopolymer containing difluoroketene hydrate repeating groups.

*Analysis.*—Calcd. for $[(CF_2C(OH)_2)_5 \cdot H_2O]_n$ (percent): C, 24.1; H, 2.43; F, 38.1. Found (percent): C, 24.0; H, 2.37; F, 38.1.

EXAMPLE II

There is described herein the preparation of a TFE/DFK copolymer employing sulfur trioxide as the Lewis acid.

(A)

A TFE/MTVE copolymer was prepared by placing in a 330 ml. shaker tube 100 ml. of $CCl_2FCClF_2$ and 0.04 gram perfluoropropionyl peroxide. Then the tube was cooled to −80° C. and evacuated. There was added to the tube 20 grams of MTVE and 40 grams of TFE. The tube was sealed and shaken for 64 hours at room temperature. The tube was opened and vented, and a small sample of the suspension therein was dried in a vacuum oven at 110° C. and pressed into a film at 300° C. and 600 p.s.i. Infrared analytical data on the film are found in the table.

(B)

To the remainder of the suspension obtained in A there was added 20 ml. of sulfur trioxide and the shaker tube was resealed. The mixture was heated for 5 hours at 180° C. under autogenous pressure and similar agitation. The tube was opened and the volatile materials removed in vacuum at room temperature. The solid polymer was recovered and stirred with 100 ml. of concentrated nitric acid for 1 hour, then filtered and washed with three 50–100 ml. portions of boiling water. The resultant product was dried in vacuum at 110° C. for 16 hours, then a sample thereof was pressed at 175° C. and about 300 p.s.i. into a transparent film. Infrared analytical data thereon are found in the table.

EXAMPLE III

There is described herein the preparation of a TFE/MTVE/DFK terpolymer, employing a sulfur trioxide as the Lewis acid.

(A)

A TFE/MTVE copolymer was prepared by placing in a 330 ml. shaker tube 150 ml. of $CCl_2FCClF_2$, 0.02 gram of perfluoropropionyl peroxide, and 21.4 grams of MTVE. The shaker tube was flushed with dry nitrogen, then 60 grams of TFE was pressured into the shaker tube. The tube was closed, shaken at 60° C. for 1 hour.

The suspension was removed from the tube, and the polymer recovered and dried at 110° C. in a vacuum oven at 16 hours to yield a light, white powder. A portion thereof was pressed into a film at 300° C. and 300 p.s.i. Infrared analytical data thereon are found in the table.

(B)

To a similar shaker tube there was added 20 grams of the copolymer obtained in A, 200 ml. of $CCl_2FCClF_2$, and 5 ml. of sulfur trioxide, under anhydrous conditions. The tube was closed and heated for 2 hours at 140° C. with agitation. Then volatile materials were removed in vacuum at room temperature. The resultant solid polymer was then cleaned with nitric acid and water as in Example II–B and dried in vacuum at 110° C. for 16 hours to yield 19.9 grams of polymer. A sample of the polymer was pressed into a transparent colorless film at 175° C. and about 300 p.s.i. Infrared analytical data are found in the table.

EXAMPLE IV

There is described herein the preparation of a TFE/PMD/DFK terpolymer, employing sulfur trioxide as the Lewis acid.

(A)

A TFE/MTVE/PMD copolymer was synethesized as follows. In a 330-ml. stainless-steel tube there was placed 150 ml. of $CCl_2FCClF_2$ and 0.5 gram perfluorpropionyl peroxide. The tube was then cooled to −80° C. and evacuated. Then there was added to the tube 3.2 grams of MTVE, 5.0 ml. of PMD, and 60 grams of TFE while the tube was held at −80° C. The tube was then sealed, warmed to 60° C., held at that temperature for 30 minutes while being shaken, then cooled to room temperature. The resultant solid polymer was recovered by filtration, then dried in vacuum at 110° C. for 16 hours. A sample was pressed into a film at 340° C. and 300 p.s.i. Infrared analytical data are found in the table.

The particle size of the polymeric product was then reduced to a finer state of subdivision by placing 20 grams thereof and 150 ml. of $CCl_2FCClF_2$ in a Waring Blendor and shearing the mixture for 30 minutes at the highest speed at which the blender could be run without causing the polymer to be ejected from the blender, thus producing a suspension.

(B)

The suspension produced in A was transferred to a 330 ml. shaker tube and 20 ml. of sulfur trioxide was introduced also. The tube was flushed with nitrogen, sealed, then shaken for 2 hours at 180° C. Then the tube was allowed to cool to 55° C. and the volatile materials were removed in vacuum at that temperature. The resultant polymer was washed with a100 ml. portion of concentrated nitric acid at 40–80° C. and three 50–100 ml. portions of distilled water at 40–80° C. The polymer was then dried in vacuum at 110° C. for 16 hours. A sample of the polymer was then pressed at 340° C. and about 600 p.s.i. into a transparent film. Infrared analytical data are found in the table.

EXAMPLE V

There is described herein the synthesis of a TFE/PMD/MTVE/DFK polymer, employing sulfur trioxide as the Lewis acid.

(A)

A TFE/PMD/MTVE terpolymer was synthesized according to the method of Example IV–A. The quantities were 150 ml. of $CCl_2FCClF_2$, 0.04 gram of perfluoropropionyl peroxide, 5 ml. of PMD, 9.1 grams of MTVE, and 60 grams of TFE. The tube was held at room temperature for 20 hours. Film was pressed at 320° C. and 300 p.s.i., on which infrared analytical data are found in the table.

The bulk of the polymer was then reduced to a finer degree of subdivision as in Example IV–A.

(B)

Into a Waring Blendor there was placed a suspension containing 20 grams of the terpolymer in 150 ml. of $CCl_2FCClF_2$ (as produced in A), and 5 ml. of sulfur trioxide. The mixture was agitated for 3 hours at room temperature at the highest speed which would not cause loss of the polymer. Volatile material were removed in vacuum and the polymer was wasted and dried as described in Example IV–B, to yield 19.0 grams of polymer. A sample of the polymer was pressed at 300° C. and about 300 p.s.i. into a transparent film. Infrared analytical data are found in the table.

EXAMPLE VI

There is described herein the preparation of a TFE/DFK/n=$C_4H_9OCF$=$CF_2$ terpolymer, employing sulfur trioxide as the Lewis acid.

(A)

A TFE/n=$C_4H_9OCF$=$CF_2$ copolymer was prepared as follows. Into a 330 ml. stainless-steel shaker tube there was charged 150 ml. of $CCl_2FCClF_2$, 10 ml. of n=$C_4H_9OCF$=$CF_2$, 0.1 gram $(C_2F_5COO)_2$, and approximately 60 grams of tetrafluoroethylene. The tube was shaken at 60° C. for 4½ hours, then cooled, vented, and the solvent was evaporated (under vacuum at room temperature) to leave a white solid polymer. A sample of the polymer was pressed into a film at 200° C. and 300 p.s.i.

(B)

In a 300 ml. round-bottom flask equipped with a magnetic stirrer and a reflux condenser topped by a drying tube, there was placed 10 grams of the finely divided white polymer from A suspended in 20 ml. of $$CCl_2FCClF_2$$

5 ml. of sulfur trioxide was slowly added to the mixture. The mixture was stirred for 16 hours at room temperature under anhydrous conditions, after which the sulfur trioxide and solvent were removed in vacuum at room temperature. The resultant solid polymer was then cleaned with nitric acid and water and dried according to the method of Example IV–B, leaving 9.2 grams of white polymer. The polymer was pressed at 175° C. and about 300 p.s.i. into a transparent film which exhibited a very strong absorbance in the infrared at 5.6 microns.

*Analysis.*—Calc'd for polymer containing 72.5% TFE/14.9% DFK/12.6% n=$C_4H_9OCF$=$CF_2$ (expressed in weight percent): H, 0.74%; F, 67.0%. Found: H, 0.74%; F, 67.01%. Expressed in mole percent, this corresponds to the following terpolymer composition: 72.7% TFE/8.2% n=$C_4H_9OCF$=$CF_2$/19.1% DFK.

The composition of the starting copolymer (VI–A) was then calculated as 72.7% TFE/27.3%

$$n=C_4H_9OCF=CF_2$$

EXAMPLE VII

There is described herein the preparation of a TFE/MTVE/PMD/DFK polymer, employing aluminum trichloride as the Lewis acid.

(A)

A TFE/MTVE/PMD terpolymer was prepared according to the mmethod of Example IV–A. The quantities employed were 150 ml. $CCl_2FCClF_2$, 0.5 gram of perfluoropropionyl peroxide, 2 ml. of PMD, 10 grams of MTVE, and 60 grams of TFE. The tube was held at 60° C. for 0.5 hour. The film was pressed at 200° C. and 300 p.s.i. Infrared analytical data are in the table.

(B)

Into a 1-liter kettle equipped with a chopper blade stirrer there was placed a suspension of 30 grams of the terpolymer in 150 ml. $CCl_2FCClF_2$, as well as 10 grams of finely divided aluminum trichloride. The mixture was stirred under dry nitrogen for 1 hour at room temperature, then the volatiles were removed in vacuum at room temperature. The polymer was washed and dried as in Example IV–B. A sample of the product was pressed into a film at 200° C. and 300 p.s.i. Infrared analytical data are in the table.

EXAMPLE VIII

There is described herein the preparation of a TFE/MTVE/PMD/DFK polymer, employing aluminum chloride as the Lewis acid.

(A)

The TFE/MTVE/PMD terpolymer of Example VII–A was employed here.

(B)

Into a 300 ml. flask equipped with a magnetic stirrer there was placed a suspension of 10 grams of the terpolymer in 150 ml. of $CCl_2FCClF_2$ and 10 grams of powdered aluminum trichloride. The mixture was stirred under dry nitrogen for 64 hours. Then 100 ml. of concentrated hydrochloric acid was added and the mixture stirred for an additional hour, after which the mixture was heated to its boiling point to drive off the $$CCl_2FCClF_2$$

solvent and coaggulate the polymer. The polymer was recovered by filtration, suspended in 200 ml. of concentrated nitric acid, and refluxed for 2 hours. The mixture was then cooled and the polymer was recovered by filtration, washed four times with 100 ml. portions of water and dried in vacuum at 100° C. for 64 hours. The weight of the polymer was 7.4 grams. A transparent film of the polymer was pressed at 175° C. and 300 p.s.i. Infrared analytical data are found in the table.

EXAMPLE IX

There is described herein the preparation of a TFE/MTVE/PMD/DFK polymer, employing titanium tetrachloride as the Lewis acid.

(A)

A TFE/MTVE/PMD terpolymer was prepared according to the method of Example IV–A. The quantities employed were 150 ml. of $CCl_2FCClF_2$, 0.04 gram of perfluoropropionyl peroxide, 5 ml. of PMD, 10 grams of MTVE, and 45 grams of TFE. The tube was held at room temperature for 24 hours. A portion of the polymer was pressed to a film at 200° C. and 300 p.s.i. Infrared analytical data are in the table.

The polymer was recovered and cut in a Waring Blendor as described in Example IV–A, employed 2.0 grams of the polymer and 20 ml. of FC-75, a Minnesota Mining and Manufacturing Company fluorinated cyclic ether having the empirical formula $C_8F_{16}O$. The cutting time was 60 minutes.

(B)

The slurry produced in A was transferred to a 50 ml. round bottom flask (equipped with a stirrer, reflux condenser, and drying tube) which had been flushed with dry nitrogen. Titanium tetrachloride (2 ml.) was added to the flask and the resultant mixture was heated with stirring at reflux conditions for 18 hours. The volatile materials were then removed in vacuum at room temperature. The product was then cleaned and dried according to the method of Example IV–B. A sample of the polymer was pressed into a film at 180° C. and about 300 p.s.i. Infrared analytical data are found in the table.

The DFK polymers of this invention are useful, for example as molding resins. The polymers of this invention can be modified by the addition thereto of antioxidants, stabilizers, pigments, and the like.

The polymers of this invention, like other fluorocarbon polymers, can comprise polymer chains terminated by a variety of groups. For example, a number of radicals are available due to decomposition of the perfluoropropionyl peroxide initiator employed in the examples. Likewise, —$CF_2H$ end groups are possible on abstraction of hydrogen from the alkyl group of the vinyl ether monomer unit. The nature of the end groups is not at the heart of this invention and thus should not be viewed as limiting the scope of this invention.

The fluorocarbon carbonyl polymers of the present invention are amenable to the formation of derivatives thereof. Illustrative of derivatives which may be formed by reaction at the carbonyl site are the hydrate; the alcoholate; and the addition products with RSH, where R is H or alkyl; with $R_2NH$, where R is H or alkyl; with HX, where X is F or Cl; etc.

The foregoing detailed description has been given for clearness of understanding. The invention is not limited to the exact details shown and described since obvious modifications will occur to those skilled in the art.

TABLE.—COMPOSITION OF POLYMERS AS DETERMINED BY INFRARED ANALYSIS

| Example | Mole percentage of monomer units in polymer | | | |
|---|---|---|---|---|
| | TFE | MTVE | DKF | PMD |
| II–A | 63.6 | 36.4 | | |
| II–B | 63.6 | 0 | 36.4 | |
| III–A | 69 | 31 | | |
| III–B | 71 | 25 | 4 | |
| IV–A | 92.5 | 3.5 | | 4.0 |
| IV–B | 92.5 | 0 | 3.5 | 4.0 |
| V–A | 81 | 17 | | 2 |
| V–B | 81 | 14 | 3 | 2 |
| VI–A[1] | 72.7 | | | |
| VI–B[1] | 72.7 | | 19.1 | |
| VII–A | 76 | 22 | | 2 |
| VII–B | 76 | 12 | 10 | 2 |
| VIII–A | 76 | 22 | 0 | 2 |
| VIII–B | 76 | 5.5 | 16.5 | 2 |
| IX–A | 75 | 20 | 0 | 5 |
| IX–B | 75 | 18 | 2 | 2 |

[1] Example VI also comprised n—$C_4H_4OCF=CF_2$ monomer: 27.3% mole percent in VI–A, and 8.2 mole percent in VI–B. These data were obtained by elemental analysis.

What is claimed is:

1. A process for preparing a fluorocarbon polymer comprising at least 0.1 mole percent difluoroketene units, —$CH_2$—C(O)—, said process comprising reacting a fluorocarbon polymer comprising alkyl trifluorovinyl ether units, —$CM_2$—CF(OR)—, in the polymer chain, where R is a monofunctional alkyl group, with a Lewis acid selected from the class consisting of sulfur trioxide, aluminum trichloride, and titanium tetrachloride at a temperature range of about 20–200° C. for about 1–75 hours, whereby at least part of said ether units are converted to said difluoroketene units.

2. A process according to claim 1 wherein the reaction is carried out in the presence of an inert liquid fluorocarbon medium.

3. A process according to claim 1 wherein said fluorocarbon polymer comprising alkyl trifluorovinyl ether units is a homopolymer of said ether units.

4. A process according to claim 1 wherein said fluorocarbon polymer comprising alkyl trifluorovinyl ether units additionally comprises tetrafluoroethylene units.

5. A process according to claim 4 wherein said fluorocarbon polymer comprising alkyl trifluorovinyl ether units additionally comprises perfluoro-2-methylene-4-methyl-1,3-dioxolane units.

6. A process according to claim 1 wherein the Lewis acids is sulfur trioxide.

7. A process according to claim 1 wherein said temperature is in the range 80–180° C. and the time is in the range 1–15 hours, and the process is conducted in the presence of an amount of sulfur trioxide at least equivalent to, on a molar basis, the amount of alkyl trifluorovinyl ether units in said polymer before initiation of said process.

8. A process according to claim 8 in which said R group is the methyl group.

9. A normally solid fluorocarbon polymer suitable for film forming derived from trifluorovinyl containing monomers and comprising at least 0.1 mole percent difluoroketene unit, —$CF_2$—$C(O)$—, in the main chain of said polymer.

10. A fluorocarbon polymer which is a homopolymer of difluoroketene units.

11. A fluorocarbon polymer according to claim 9 which is a copolymer of said difluoroketene units and tetrafluoroethylene units.

12. A fluorocarbon polymer according to claim 11 which additionally has perfluoro-2-methylene-4-methyl-1,3-dioxolane units.

13. A normally solid fluorocarbon polymer according to claim 11 containing hydrated difluoroketene units in the main chain of the polymer.

References Cited

UNITED STATES PATENTS

| 3,324,778 | 9/1967 | Anderson | 260—63 |
| 3,391,119 | 7/1968 | Anderson | 260—63 |

JOSEPH L. SCHOFER, Primary Examiner

J. A. DONAHUE, JR., Assistant Examiner

U.S. Cl. X.R.

260—63, 91.1

UNITED STATES PATENT OFFICE
CERTIFICATE OF CORRECTION

Patent No. 3,525,724      Dated August 25, 1970

Inventor(s) Edward Noonan Squire and William Franklin Gresham

It is certified that error appears in the above-identified patent and that said Letters Patent are hereby corrected as shown below:

Column 1, line 57, the formula should appear as follows:

$$CF_2=CF(OR),$$

Column 6, lines 37, 40, 67 and 71,
Column 3, lines 74 and 75, the same formula appearing a total of six times should appear each time as follows:

$$n-C_4H_9OCF=CF_2,$$

Column 8, line 63, the formula should appear as follows:

$$-CF_2-CF(OR)-,$$

Column 9, line 17, "8" should be -- 7 --, and

Column 10, line 10, "11" should be -- 10 --.

SIGNED AND SEALED

FEB 23 1971

(SEAL)
Attest:

Edward M. Fletcher, Jr.
Attesting Officer

WILLIAM E. SCHUYLER, JR.
Commissioner of Patents